J. F. O'CONNOR.
FRICTION GEAR.
APPLICATION FILED JUNE 9, 1917.
1,290,316.
Patented Jan. 7, 1919.
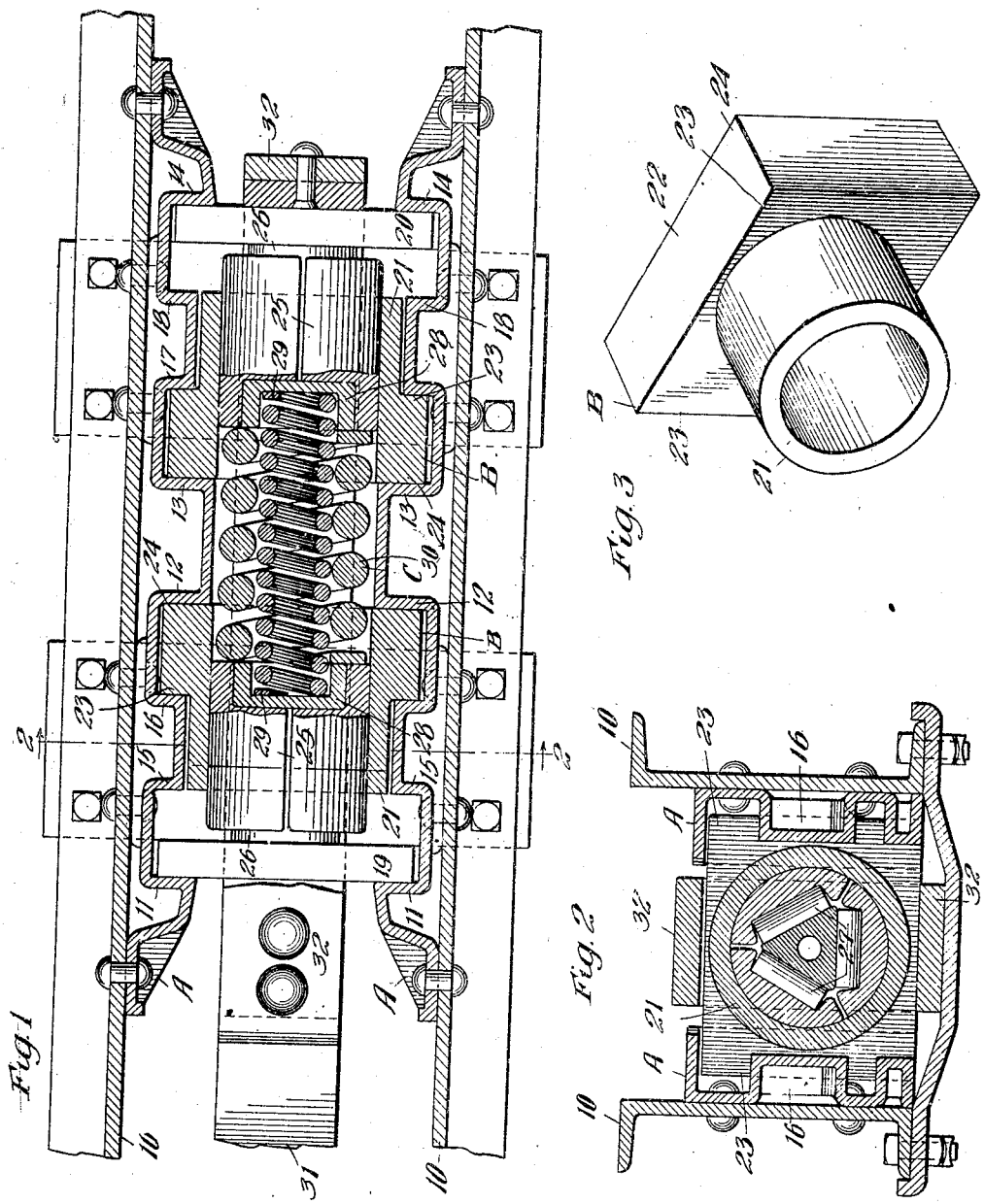
WITNESSES:
Wm. Geiger
INVENTOR.
John F. O'Connor
BY George I. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION-GEAR.

1,290,316. Specification of Letters Patent. Patented Jan. 7, 1919.

Application filed June 9, 1917. Serial No. 173,858.

*To all whom it may concern:*

Be it known that I, JOHN F. O'CONNOR, a citizen of the United States, residing at Chicago, in the county of Cook and State of Illinois, have invented a certain new and useful Improvement in Friction-Gears, of which the following is a full, clear, concise, and exact description, reference being had to the accompanying drawings, forming a part of this specification.

This invention relates to improvements in friction gears.

One object of the invention is to provide a friction gear adapted for use in combination with tandem spring stop castings such as now employed on railway cars.

Another object of the invention is to provide a friction gear of the type above indicated which is of relatively inexpensive design and which may be easily applied or taken off.

In the drawing forming a part of this specification, Figure 1 is a horizontal longitudinal sectional view of a portion of a draft rigging showing my improvements in connection therewith. Fig. 2 is a vertical transverse sectional view, taken on the line 2—2 of Fig. 1. And Fig. 3 is a perspective view of one of the friction shells employed with my arrangement.

In said drawing, 10—10 denote channel-shaped center or draft sills to the inner faces of which are riveted tandem stop castings A—A. Each of said stop castings or cheek plates A is of a well known form and is provided with main front stop shoulder 11, main front intermediate stop shoulder 12, main rear intermediate stop shoulder 13, rear main stop 14, and corresponding limiting stops 15, 16, 17 and 18.

The improved friction gear designed for coöperation with tandem stop castings comprises, as shown in the drawing, two independent relatively short friction cylinders B—B; a set of friction elements coöperable with each shell B; a common spring C interposed between the friction elements of the two friction units, and end followers 19 and 20. Each of the friction shells B comprises a cylindrical friction shell 21 proper and a rectangular enlargement 22 at one end of the shell which forms vertically extended shoulders 23 and 24 on each side thereof. The thickness of the enlargement 22 is designed to just fit between an intermediate main stop and its corresponding limiting stop so that, when the friction shell is elevated in position between two stop castings, it will be held thereby from longitudinal movement. The length of the friction shell 21 proper is designed so as to come flush with the limiting stop associated with either the front or rear main stops, as clearly illustrated in Fig. 1, and to thereby permit the necessary movement of the followers 19 and 20.

Each set of friction elements that coöperates with a friction shell B consists of a series of circularly arranged friction shoes 25, a wedge 26, anti-friction rollers 27 interposed between the wedge and shoes, and an inner washer 28 fitting within the inner ends of the friction shoes to hold the latter properly spaced apart and also to form a suitably bearing for the inner coil 29 of the spring C, the latter having also an outer heavy coil 30.

The operation is as follows: Upon buffing or inward movement of the draw bar 31, the front follower 19 will force the friction elements of the front friction unit inwardly relatively to the front friction shell B and during this movement, the friction elements will be resisted by the spring C inasmuch as the rear end of the latter is held stationary by the friction elements of the rear friction unit.

Upon pulling or draft movement, the draw bar 31 through the yoke 32, will pull the rear follower 20 forwardly, thus actuating friction elements of the rear friction unit. During the draft movement, it is obvious that the front friction unit will remain inoperative, thus holding the forward end of the spring C so that the latter is enabled to resist movement of the friction elements of the rear unit. It is also obvious that the capacities of the friction units may be made different by varying the arrangement of friction elements so as to provide an easier draft action, if desired.

The arrangement shown is simple; it can be easily applied to tandem stop castings now in service to thus give greater capacity than the tandem spring gears; a single spring is employed to resist the movements of the friction elements of both units; and the friction shells are short and hence relatively cheap to manufacture, as compared with many friction shells now used in friction gears.

I claim:

In a draft rigging, the combination with tandem stop castings having main and limiting stops, of two friction shells having shouldered portions engaging between main and limiting stops of said castings and prevented from movement thereby, friction elements coöperable with each shell, and spring means to resist movement of said elements relatively to the shells.

In witness that I claim the foregoing I have hereunto subscribed my name this 19th day of May, 1917.

JOHN F. O'CONNOR.